United States Patent
Caveney et al.

(10) Patent No.: US 7,661,632 B2
(45) Date of Patent: Feb. 16, 2010

(54) MOUNTING DEVICE FOR STUDS COMPRISING T-SHAPED CHANNELS

(75) Inventors: Jack E Caveney, Hinsdale, IL (US); Kevin Larry Nelson, Cumming, GA (US)

(73) Assignees: Panduit Corp., Tinley Park, IL (US); Bombardier Transportation GmbH, Berlin (DE)

( * ) Notice: Subject to any disclaimer, the term of this patent is extended or adjusted under 35 U.S.C. 154(b) by 327 days.

(21) Appl. No.: 11/744,449

(22) Filed: May 4, 2007

(65) Prior Publication Data

US 2007/0257158 A1 Nov. 8, 2007

Related U.S. Application Data

(60) Provisional application No. 60/746,713, filed on May 8, 2006.

(51) Int. Cl.
*F16L 3/08* (2006.01)
(52) U.S. Cl. .......................... 248/74.2; 248/71; 248/73; 248/74.3
(58) Field of Classification Search .................. 248/71, 248/73, 74.2, 74.3
See application file for complete search history.

(56) References Cited

U.S. PATENT DOCUMENTS

| | | | | |
|---|---|---|---|---|
| 2,531,352 A | * | 11/1950 | Churchill | 24/291 |
| 2,712,917 A | * | 7/1955 | Flora et al. | 403/397 |
| 2,873,082 A | * | 2/1959 | Gillespie | 248/300 |
| 3,024,509 A | * | 3/1962 | Hamann | 24/453 |
| 4,353,519 A | | 10/1982 | Bogart | |
| 4,524,937 A | * | 6/1985 | Zizan | 248/74.3 |
| 4,542,871 A | | 9/1985 | Fortsch | |
| 4,600,174 A | * | 7/1986 | Gosse et al. | 248/72 |
| 4,638,966 A | * | 1/1987 | Ford | 248/62 |
| 4,697,774 A | | 10/1987 | Sarton et al. | |
| 4,889,299 A | | 12/1989 | Sarton et al. | |
| 4,896,851 A | | 1/1990 | Shaull | |
| 5,375,798 A | * | 12/1994 | Hungerford, Jr. | 248/58 |
| 5,411,356 A | * | 5/1995 | Travis et al. | 411/85 |
| 5,505,411 A | * | 4/1996 | Heaton et al. | 248/70 |
| 5,725,185 A | * | 3/1998 | Auclair | 248/74.2 |
| 5,873,550 A | * | 2/1999 | Phillips | 248/73 |
| 6,126,122 A | * | 10/2000 | Ismert | 248/74.1 |

(Continued)

FOREIGN PATENT DOCUMENTS

IT 1108759 A 12/1985

OTHER PUBLICATIONS

Bosch Catalog pp. 6-7; 6-12; 10-7; and 11-7, date unknown.

*Primary Examiner*—J. Allen Shriver, II
*Assistant Examiner*—Michael McDuffie
(74) *Attorney, Agent, or Firm*—Robert A. McCann; Christopher S. Clancy (57) ABSTRACT

A mounting device securable to a structure comprising a channel comprises a plate, a cable management member and an engagement member for securing the device to the structure. The mounting device may be secured to the structure by inserting an installation tool into the geometric opening and rotating the mounting device. The engagement member may comprise opposing retaining tabs extending from a bottom surface of the plate or opposing depressions formed in a top surface of the plate. The cable management member may comprise a pair of bridge arms that form a geometric opening.

24 Claims, 6 Drawing Sheets

U.S. PATENT DOCUMENTS

| | | | |
|---|---|---|---|
| 6,463,961 B1 * | 10/2002 | Iizuka | 138/107 |
| 6,511,028 B1 * | 1/2003 | Gretz | 248/222.52 |
| 6,724,637 B2 * | 4/2004 | Li et al. | 361/760 |
| 7,052,222 B2 | 5/2006 | Muller et al. | |
| 7,523,897 B2 * | 4/2009 | Boltz et al. | 248/71 |
| 2002/0074461 A1 * | 6/2002 | Gombert | 248/74.1 |

* cited by examiner

MOUNTING DEVICE FOR STUDS COMPRISING T-SHAPED CHANNELS

FIELD OF INVENTION

This invention relates to mounting devices and more particularly, to mounting devices used with studs comprising channels, particularly T-shaped channels.

BACKGROUND

Mounting devices are often secured to a variety of structures for receiving and carrying items, such as electrical equipment and cable bundles. In the rail, trucking, and airplane industries, for example, mounting devices are secured to elongated studs positioned in various orientations on interior or exterior surfaces of railcars, trucks, and aircraft. Since these studs typically comprise T-shaped channels that extend along a length of the stud, it is often desirable to secure the mounting devices to or within the T-shaped channel at a desired position to create a secure connection for receiving and carrying the aforementioned equipment or cables. It is also desirable to provide mounting devices that are easy and efficient to install.

SUMMARY OF THE INVENTION

The present invention relates to an improved mounting device for use with studs comprising channels, particularly T-shaped channels. Typically, the mounting device is constructed of metal.

In one embodiment, the mounting device of the present invention comprises a plate comprising a top surface, a bottom surface and opposing ends, the plate defining a plane, a cable management member and a depression formed in the top surface of the plate. The cable management member is adapted to receive and carry a plurality of cables. The depression comprises a first surface extending downwardly from the bottom surface of the plate and terminating in a first end portion spaced apart from the bottom surface of the plate and a second surface angled downwardly from the bottom surface of the plate and terminating in a second end portion spaced apart from the bottom surface of the plate and connected to the first end portion. The first surface is positioned transverse to the plane of the plate. The first surface is also positioned to abut an internal side surface of the stud defining the channel when the mounting device is positioned within the channel.

In another embodiment the mounting device of the present invention comprises a plate comprising a top surface, a bottom surface and opposing ends, a cable management member for receiving and carrying a plurality of cables and opposing retention tabs for securing the mounting device within the channel. The opposing retention tabs extend downwardly from the bottom surface of the plate and comprise a first section and a second section, the first section transverse to the bottom surface of the plate and the second section connected to and forming an acute angle with the first section. The retention tabs may also be offset from one another and are alternatively disposed in a first position, wherein the mounting device is capable of being moved along a length of the channel and a second position, wherein the mounting device is secured within the channel.

In still another embodiment, the mounting device of the present invention comprises a plate defining a plane and comprising a top surface and a bottom surface, a cable management member and an engagement member positioned below the bottom surface of the plate for securing the mounting device within the channel. The cable management member comprises a substantially planar surface for receiving and carrying a plurality of cables and opposing arms formed in a central region of the plate. The arms extend in opposite directions through a bend of about 180 degrees to first and second end portions respectively, with top surfaces of the arms forming the planar surface.

The above-described embodiments may incorporate various additional features.

The plate may, for example, comprise two or more side surfaces, with at least one first side surface angled upwardly relative to the plane of the plate and at least one second side surface angled downwardly relative to the plane of the plate. These two or more side surfaces may further comprise two pair of opposing side surfaces separated by a notch, with each pair of opposing side surfaces comprising a first side surface and a second side surface positioned on opposite sides of the plate.

The cable management member may comprise an opening for receiving and holding a releasably securable cable management device for receiving and carrying the plurality of cables. The cable management member may comprise first and second end portions, each comprising a notch. These notches may together form an opening that geometrically conforms to a head of a tool for rotating the mounting device.

A surface of the depression may be perpendicular to the plane of the plate. The depression may comprise opposing depressions positioned to engage the mounting device within the channel, with the second surfaces of the opposing depressions angled downwardly in opposite directions.

The retaining tabs may project downwardly from the bottom surface of the plate and together comprise a T-shape. In some cases, the first section of the retaining tabs is perpendicular to the plane of the plate. Further, at least one of the first and second sections of the retaining tabs may be transverse to a longitudinal axis of the channel with the mounting device secured within the channel.

BRIEF DESCRIPTION OF THE DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

DETAILED DESCRIPTION

Figure 1:
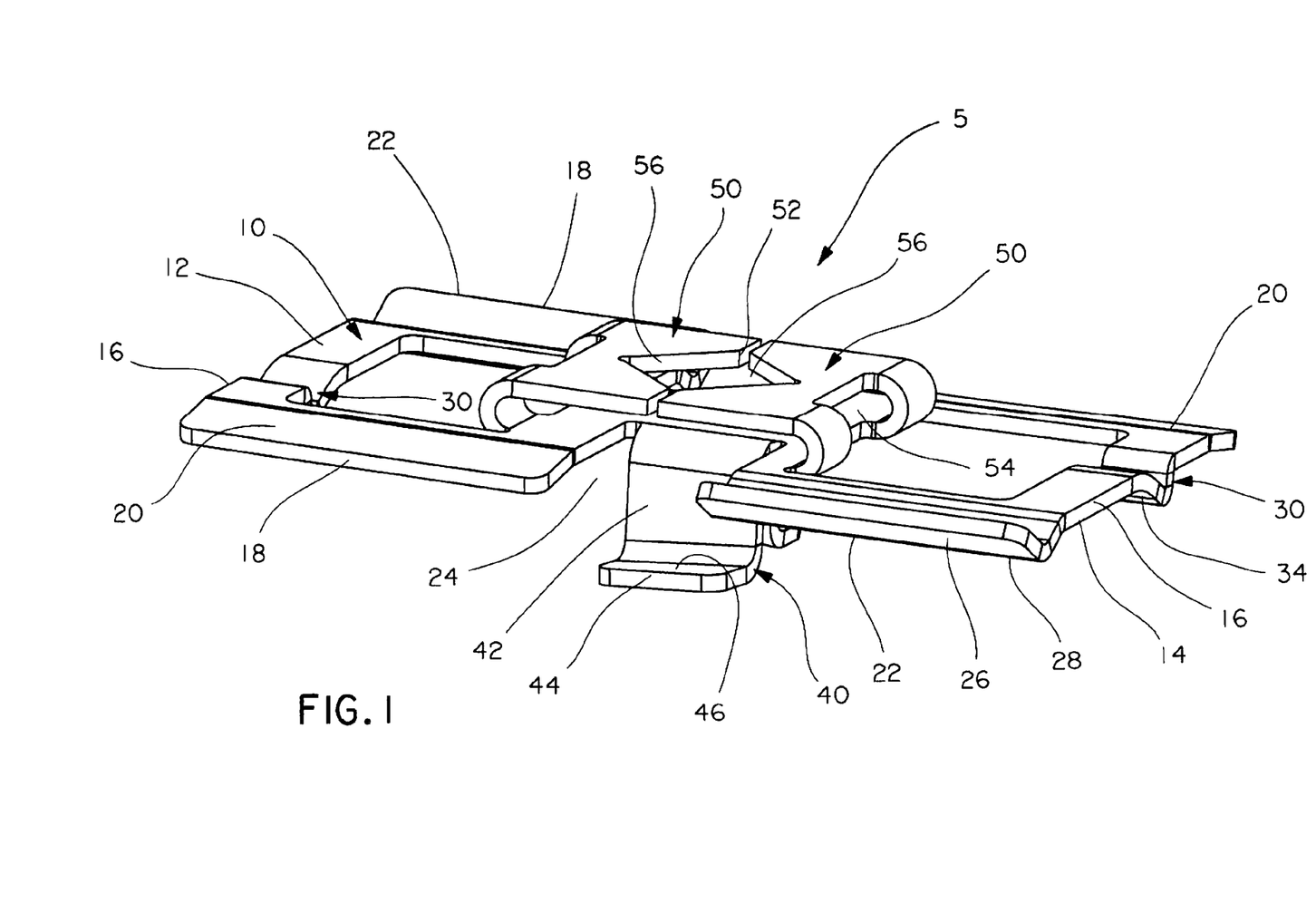
FIG. 1 is a top perspective view of one example of a mounting device according to the present invention.
Figure 2:
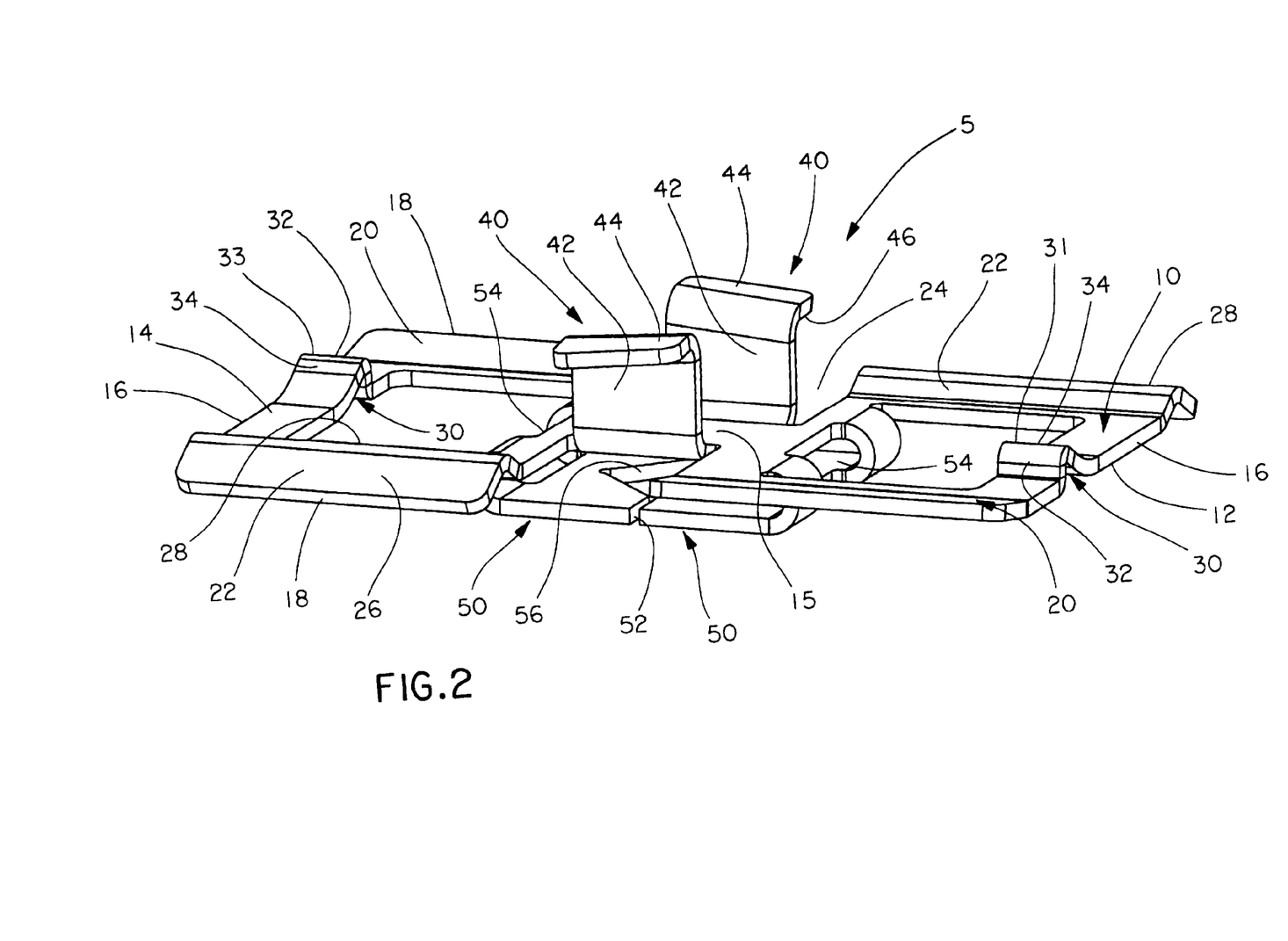
FIG. 2 is a bottom perspective view of the mounting device of FIG. 1.
Figure 3:
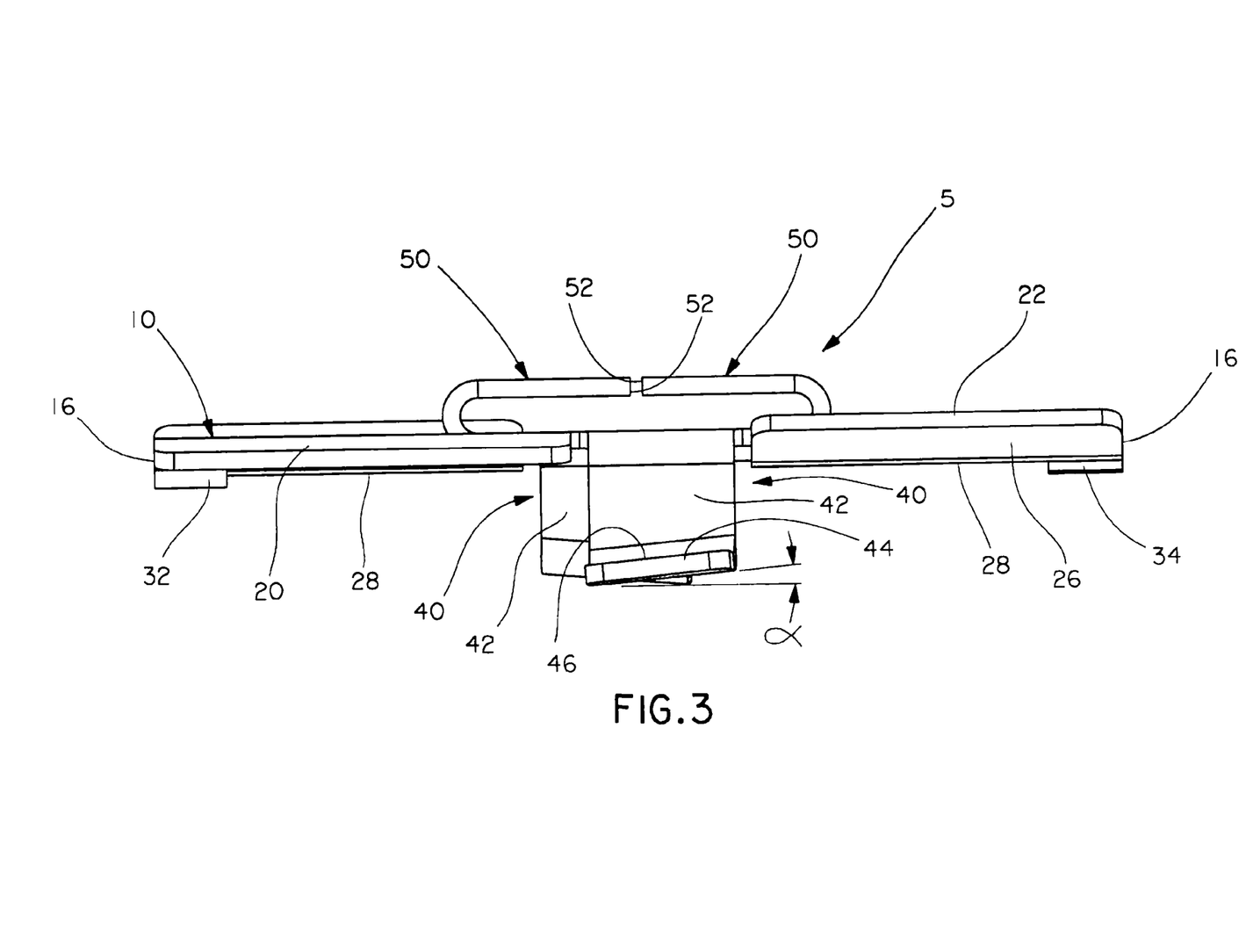
FIG. 3 is a side elevational view of the mounting device of FIG. 1.

Referring to FIGS. 1-3, one example of a mounting device 5 of the present invention is shown. Mounting device 5 generally includes a plate 10, a pair of retaining tabs 40, and a pair of bridge arms 50.

Plate 10 generally has a top surface 12, a bottom surface 14, opposing ends 16 and opposing sides 18. Sides 18 each have a first section 20 and a second section 22 separated by a notch 24. First sections 20 of sides 18 are angled slightly downward from the plane of plate 10. The downward angle of first sections 20 helps ensure that first sections 20 are in contact with and compressed against the external surface of a stud when mounting device 5 is installed. In the example shown, first sections 20 are angled approximately 10° below the surface of plate 10 and could be angled from about 5° to about 30°. Second sections 22 of sides 18 are formed in a generally V-shaped configuration such that the lowest portion of second sections 22 are below the plane of plate 10. The generally V-shaped configuration of second section 22 provides an angled surface 26 that assists in the installation of mounting device 5, as described below, and a contact surface 28 that ensures that second sections 22 are in contact with and compressed against the external surface of a stud when mounting device 5 is installed. In the example shown, the V-shaped configuration is formed with both sides being approximately 30° from the plane of plate 10.

Depressions 30 formed in top surface 12 of plate 10 and retaining tabs 40 projecting downwardly from bottom surface 14 of plate 10 may serve as an engagement member.

Depressions 30 are formed in plate 10 at ends 16 to prevent rotation of the mounting device 5 in a counter-clockwise direction once plate 10 is installed, as described below. Depressions 30 may comprise first surface 32 (see FIG. 2) that is transverse (generally perpendicular) to the plane of plate 10 and has a length of approximately 0.063 inches and a second surface 34 that is angled slightly downward from the plane of plate 10. First and second surfaces 32 and 34 terminate in first and second end portions 31 and 33, which are connected and spaced apart from bottom surface 14 of plate 10. First surface 32 may be positioned to abut an internal side surface of a stud comprising a channel, thereby engaging mounting device 5 within the channel. In the example shown, second surface 34 is angled approximately 30° relative to bottom surface 14 of plate 10 and opposing second surfaces 34 of opposing depressions 30 are angled in opposite directions.

Retaining tabs 40 each have a first section 42 and a second section 44. Retaining tabs 40 generally form a T-shape and may be alternatively disposed in a first position, wherein the mounting device is capable of being moved along a length of a channel and a second position, wherein the mounting device is secured within the channel. First sections 42 extend from a central portion 15 (see FIG. 2) of plate 10, are generally transverse to the plane of plate 10, and are spaced approximately 0.289 inches apart. Second section 44 extends outward from the end of first section 42, opposite plate 10, and is generally perpendicular to first section 42. In the example shown, first section 42 has a length of approximately 0.213 to 0.242 inches and second section 44 has a length of approximately 0.165 inches. As can best be seen in FIG. 3, second sections 44 are inclined in a longitudinal direction from the plane of plate 10 by incline angle $\alpha$, thereby forming an acute angle with first section 42. In the example shown, incline angle $\alpha$ is approximately 5° and could be any angle from approximately 5° to approximately 20°. In addition, first sections 42 of retaining tabs 40 are offset from each other in a longitudinal direction, which prevents mounting device 5 from over-rotating in a clock-wise direction during installation, as described below.

Bridge arms 50 are substantially planar and extend in opposite directions from central portion 15 of plate 10, through a bend of approximately 180°, to ends 52, thereby acting as a cable management member for receiving and carrying cables. In the example shown, bridge arms 50 are approximately 0.63 inches wide and are located approximately 0.072 inches above top surface 12 of plate 10. Each bridge arm 50 may comprise an aperture 54 that is positioned at the bend in the bridge arm 50 such that the apertures 54 are generally aligned along a longitudinal axis of plate 10. Apertures 54 are adapted to receive cable ties, as described below and in the example shown are approximately 0.315 inches wide. Ends 52 of bridge arms 50 have a notch formed therein that together form a geometric opening 56 that is adapted to receive the head of an installation tool. In the example shown, the notches are V-shaped and are approximately 0.25 inches on each side, thereby forming a geometric opening 56 that is a square approximately 0.25 inches on each side and is adapted to receive a 0.25 inch square drive installation tool. Geometric opening 56 can also act as a cable management member, for example, when a cable management device for carrying cables is secured to geometric opening 56.

The mounting device 5 described above can be manufactured using a variety of processes, one of which will be described herein. In the example shown, plate 10 of mounting device 5 is made from steel, for example AISI 1050 steel, and is approximately 0.036 inches thick.

To form bridge arms 50, the outline of bridge arms 50, the apertures 54, and the notches in ends 52 are cut or punched into plate 10. Each of these features can be formed individually or all of them can be formed at the same time in a single punch press. Bridge arms 50 are then bent through approximately 180° such that ends 52 meet at approximately the center of plate 10, apertures 54 are generally aligned, and the notches form geometric opening 56.

To form retaining tabs 40, the outline of retaining tabs 40 is cut or punched into plate 10. Each retaining tab 40 is then bent at the end integral with plate 10 until it is approximately perpendicular to plate 10, which forms first sections 42 and creates notches 24. Each retaining tab 40 is then bent near the end opposite plate 10 to form second section 44.

The angle of first sections 20 of sides 18, V-shaped configuration of second sections 22 of sides 18, and depressions 30 in ends 16, can be formed by placing plate 10 in a press or by any other well known metal forming means.

Figure 4:
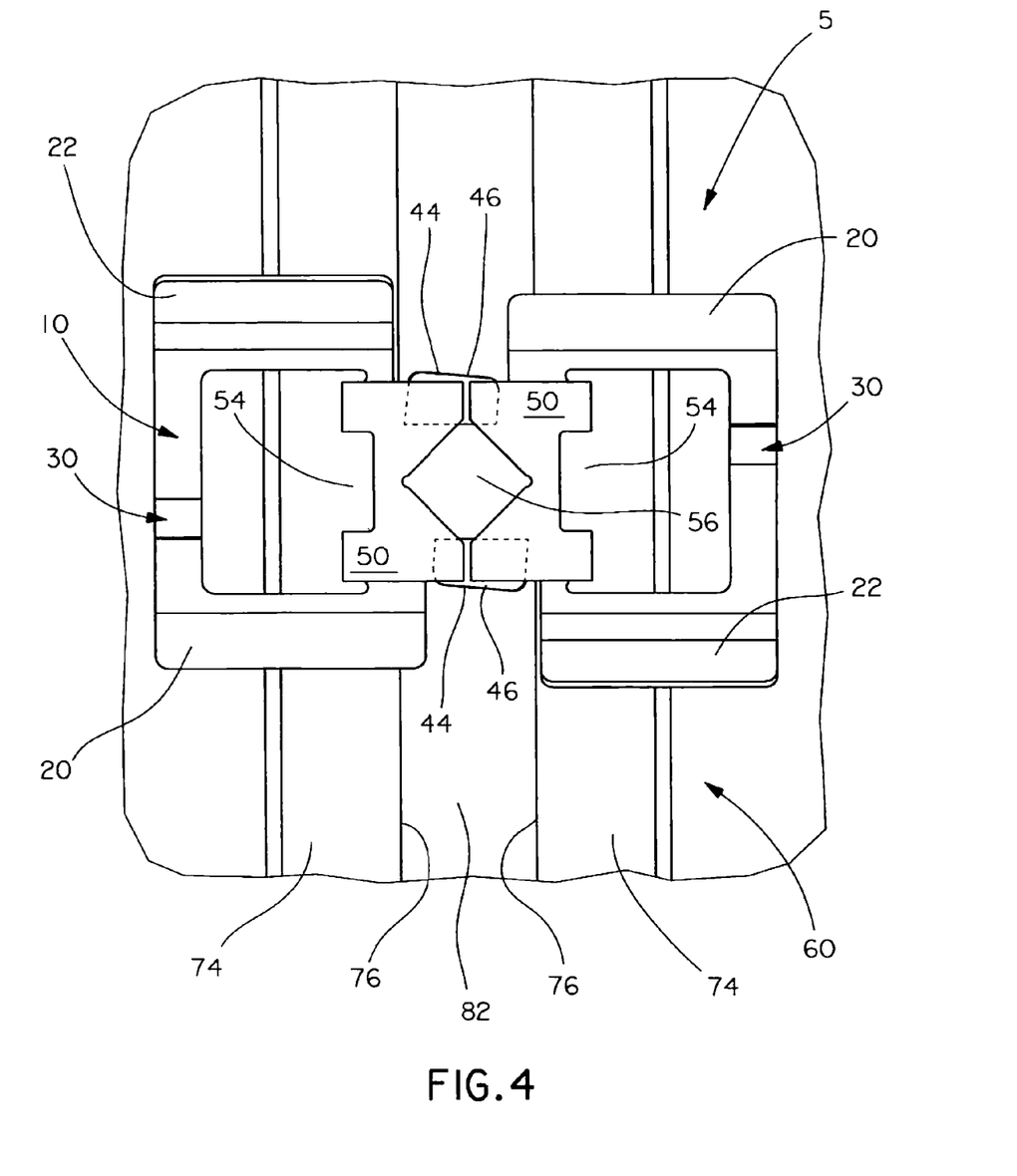
FIG. 4 is a top plan view of the mounting device of FIG. 1 during Installation.
Figure 5:
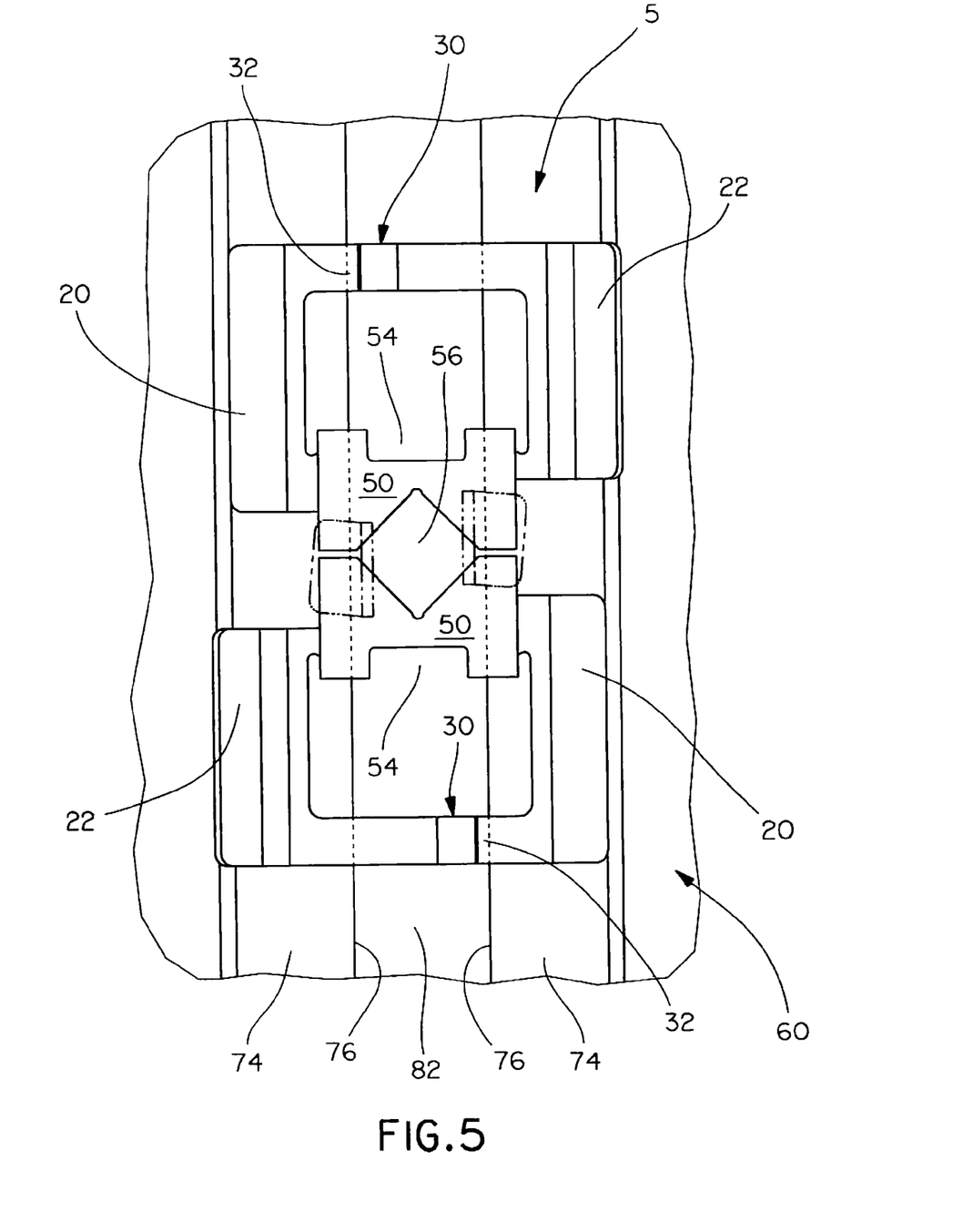
FIG. 5 is a top view of the mounting device of FIG. 1 fully installed.
Figure 6:
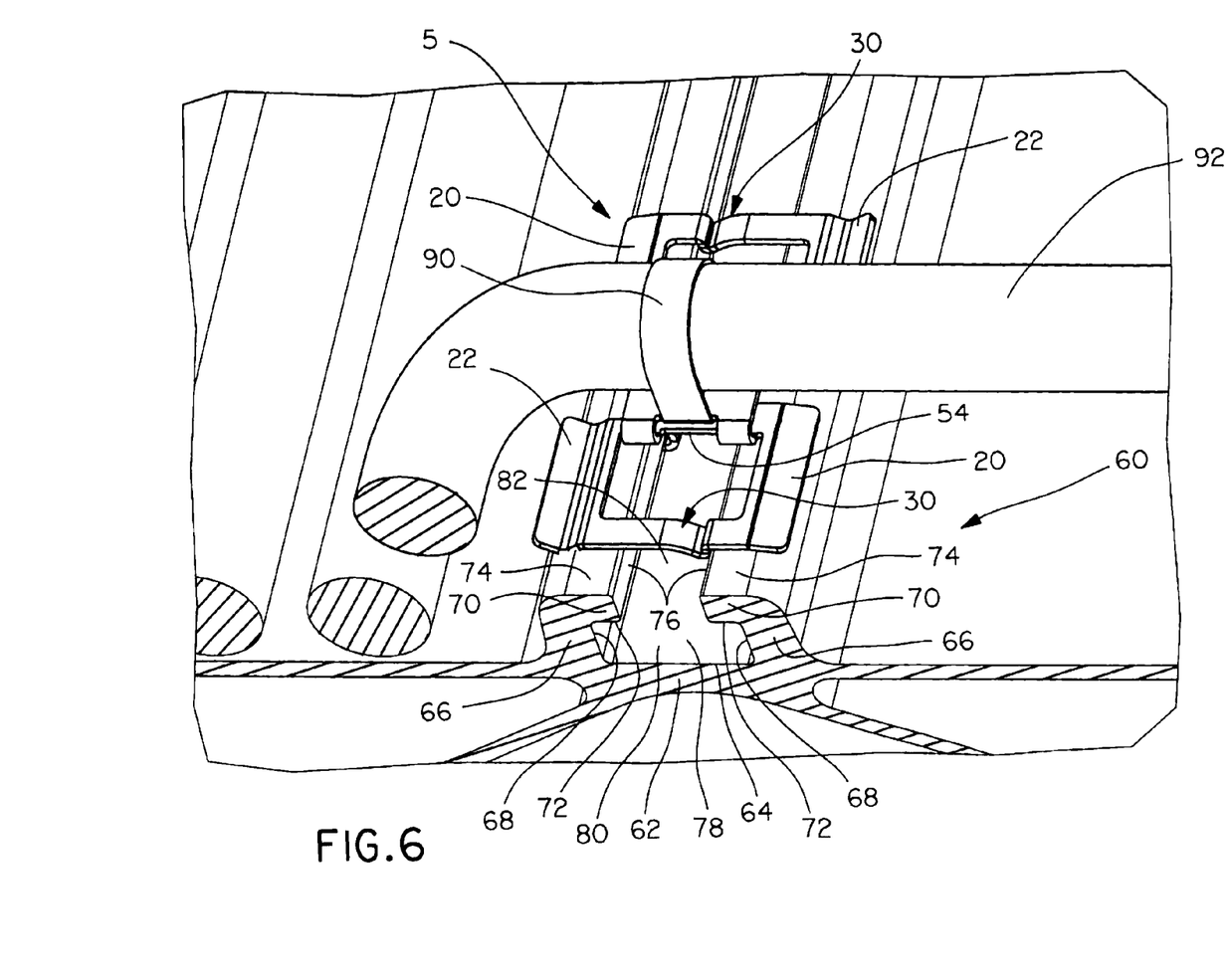
FIG. 6 is a top perspective view of the mounting device of FIG. 1 fully installed with a cable secured thereto.

Referring to FIGS. 4-6, mounting device 5 is typically installed on a stud 60. Studs are typically used in railcars, trucks, or aircraft for mounting various items, such as electrical equipment and cables and may be positioned in virtually any orientation, including on a ceiling.

Referring specifically to FIG. 6, stud 60 is generally an elongated structure having a base 62, side walls 66 and top walls 70. Base 62 has an internal surface 64 and can be a separate part that is secured to the railcar, truck, or aircraft or can be an integral part of the railcar, truck, or aircraft. Side walls 66 extend from base 62, are generally perpendicular to base 62, and have internal surfaces 68. Top walls 70 extend from the ends of side walls 66, opposite base 62, are generally parallel to base 62, and have internal surfaces 72, external surfaces 74 and end surfaces 76. Together, base 62, side walls 66, and top walls 70 form T-shaped channel 78, which has a base portion 80 and a neck portion 82 that run along the length of stud 60.

Base portion 80 of T-shaped channel 78 generally has a width dimension between about 0.50 and 2.0 inches and is typically 0.50 inches, 1.0 inch, or 1.5 inches. The corresponding neck portion 82 of T-shaped channel 78 generally has a width dimension between about 0.25 and 1.0 inch and is typically 0.43 inches, 0.58 inches. or 0.88 inches. Of course, as the dimensions of T-shaped channel 78 change, the dimensions of mounting device 5 would also change. Given the dimensions provided herein, one of ordinary skill can readily calculate ratios for arriving at the appropriate dimensions and angles for mounting device 5.

Installation of mounting device 5 into stud 60 comprises a series of steps. Referring specifically to FIG. 4, mounting device 5 is positioned on stud 60 such that the longitudinal axis of mounting device 5 is generally perpendicular to the longitudinal axis of stud 60 and second sections 44 of retaining tabs 40 are oriented in general alignment with the neck portion 82 of T-shaped channel 78. Second sections 44 are then passed through neck portion 82 into base portion 80 of T-shaped channel 78. Once second sections 44 are positioned within T-shaped channel 78, mounting device 5 may be moved axially or longitudinally up and down T-shaped channel 78 to a desired position.

To lock mounting device 5 into position, an installation tool (not shown) is inserted into geometric opening 56 and is used to rotate mounting device 5 a quarter turn, or approximately 90°, typically in a clockwise direction. The use of an installation tool allows a user to use a greater amount of force to rotate the mounting device during installation. During rotation, the inclined surfaces 46 of retaining tabs 40 contact internal surfaces 72 of top walls 70 of stud 60, which creates a downward pulling force on mounting device 5, causing the angled surface 26 of opposing sides 18 to begin to ride on and across external surfaces 74 of top walls 70. In addition, as rotation continues, second surfaces 34 of depression 30 will ride up and over external surfaces 74 of top walls 70 and deflect in an upward direction.

Referring to FIG. 5, as the rotation reaches the approximate 90° position, depressions 30 will deflect downwardly into neck portion 82 of T-shaped channel 78 and first surfaces 32 of depressions 30 will engage end surfaces 76 of T-shaped channel 78, usually with an audible click, preventing rotation of mounting device 5 in a counter-clockwise direction. In this position, mounting device 5 is secured to T-shaped channel 78 and cannot be easily removed. In addition, because first sections 42 of retaining tabs 40 are offset from each other, mounting device 5 cannot be rotated past the approximate 90° position. If mounting device 5 is rotated past 90°, first sections 42 of retaining tabs 40 would engage end surfaces 76 of top walls 70 and prevent further rotation.

Finally, as the rotation reaches the approximate 90° position, second sections 44 of retaining tabs 40 are fully engaged with internal surfaces 72 of top walls 70 and are positioned so that they are generally transverse to the longitudinal axis of stud 60. Because of inclined surfaces 46, this creates a downward pulling force on mounting device 5, which pulls the edge of first section 20 and contact surface 28 of second section 22 into firm contact with external surface 74 of top walls 70 and contact surface 28 to begin to ride on and across external surfaces 74 of top walls 70. This contact on both sides of top walls 70 ultimately creates a high friction or interference fit, which prevents axial or longitudinal slipping of mounting device 5 after installation. In addition, studs are typically made of a relatively soft material, such as aluminum, while mounting device 5 typically would be made of a much harder material, such as steel. In this instance, the edge of second sections 44 of retaining tabs 40 will slightly bite or dig into the internal surfaces 72 of top walls 70, further securing mounting device 5 to stud 60.

Referring again to FIG. 6, a cable tie 90 may be placed through apertures 54 in bridge arms 50 and looped around a cable 92, or cable bundle, to secure cable 92 firmly in position. Alternatively, it a cable or cable bundle were to be secured running parallel to the longitudinal axis of mounting device 5, a cable tie 90 could be placed underneath the bridge arms 50 and perpendicular to the alignment of apertures 54 and looped around the cable or cable bundle.

While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation. The actual scope of the invention is intended to be defined in the following claims.

The invention claimed is:

1. A mounting device for use with a stud comprising a channel, the mounting device comprising:
   a plate comprising a top surface, a bottom surface and opposing ends, the plate defining a plane;
   a cable management member for receiving and carrying a plurality of cables; and
   a depression formed in the top surface of the plate, the depression comprising a first surface extending downwardly from the bottom surface of the plate and terminating in a first end portion spaced apart from the bottom surface of the plate, the first surface positioned transverse to the plane of the plate, the depression further comprising a second surface angled downwardly from the bottom surface of the plate and terminating in a second end portion spaced apart from the bottom surface of the plate and connected to the first end portion, the first surface positioned to abut an internal side surface of the stud when the mounting device is positioned within the channel; and
   wherein an edge of at least one of said opposing ends defines at least a portion of said depression.

2. The mounting device of claim 1, wherein the cable management member comprises a substantially planar surface for receiving and carrying the plurality of cables and opposing apertures for receiving a cable tie.

3. The mounting device of claim 2, wherein the cable management member comprises opposing arms formed in a central region of the plate, the arms extending in opposite directions through a bend of about 180 degrees to first and second end portions respectively, with top surfaces of the arms forming the planar surface.

4. The mounting device of claim 1, wherein the cable management member comprises an opening for receiving and holding a releasably securable cable management device for receiving and carrying the plurality of cables.

5. The mounting device of claim 1, wherein the first surface is perpendicular to the plane of the plate.

6. The mounting device of claim 1, wherein the depression comprises opposing depressions positioned to engage the mounting device within the channel and the second surfaces of the opposing depressions are angled downwardly in opposite directions.

7. The mounting device of claim 1, wherein the channel is T-shaped and the mounting device further comprises opposing retaining tabs projecting downwardly from the bottom surface of the plate that together comprise a T-shape.

8. The mounting device of claim 1, wherein the plate comprises opposing sides, with at least one first side surface angled upwardly relative to the plane of the plate and at least one second side surface angled downwardly relative to the plane of the plate.

9. The mounting device of claim 8, wherein the opposing sides comprise a first side surface and a second side surface separated by a notch, with the first side surface angled upwardly relative to the plane of the plate and the second side surface angled downwardly relative to the plane of the plate.

10. A mounting device for use with a stud comprising a channel, the mounting device comprising:
- a plate comprising a top surface, a bottom surface and opposing ends, wherein the plate defines a plane and comprises opposing sides, with a first side surface angled upwardly relative to the plane of the plate and a second side surface positioned on an opposite side of the plate and angled downwardly relative to the plane of the plate;
- a cable management member for receiving and carrying a plurality of cables; and
- opposing retention tabs for securing the mounting device within the channel, the opposing retention tabs extending downwardly from the bottom surface of the plate and comprising a first section and a second section, the first section transverse to the bottom surface of the plate and the second section connected to the first section and forming an acute angle therewith, the retention tabs alternatively disposed in a first position, wherein the mounting device is capable of being moved along a length of the channel and a second position, wherein the mounting device is secured within the channel.

11. The mounting device of claim 10, wherein the cable management member comprises a substantially planar surface for receiving and carrying the plurality of cables and opposing apertures for receiving a cable tie.

12. The mounting device of claim 10, wherein the cable management member comprises opposing arms formed in a central region of the plate, the arms extending in opposite directions through a bend of about 180 degrees to first and second end portions respectively, with top surfaces of the arms forming the substantially planar surface.

13. The mounting device of claim 10, wherein the cable management member comprises an opening for receiving and holding a releasably securable cable management device for receiving and carrying the plurality of cables.

14. The mounting device of claim 10, wherein the first section is perpendicular to the plane of the plate.

15. The mounting device of claim 10, wherein the top surface of the plate comprises opposing depressions positioned to engage the mounting device within the channel and the opposing depressions comprise downwardly projecting surfaces angled in opposite directions relative to the bottom surface of the plate.

16. The mounting device of claim 10, wherein the channel is T-shaped and the retaining tabs together comprise a T-shape.

17. The mounting device of claim 10, wherein the retention tabs are offset from one another.

18. The mounting device of claim 10, wherein the plate defines a plane and comprises opposing sides, with a first side surface angled upwardly relative to the plane of the plate and a second side surface positioned on an opposite side of the plate and angled downwardly relative to the plane of the plate.

19. A mounting device for use with a stud comprising a channel, the mounting device comprising:
- a plate defining a plane and comprising a top surface, a bottom surface, opposing ends and a central region positioned between the opposing ends;
- a cable management member comprising a substantially planar surface for receiving and carrying a plurality of cables, the cable management member comprising opposing arms formed in the central region of the plate, the arms extending in opposite directions through a bend of about 180 degrees to first and second end portions respectively, with top surfaces of the arms forming the planar surface; and
- an engagement member positioned below the bottom surface of the plate, the engagement member for securing the mounting device within the channel.

20. The mounting device of claim 19, wherein the first and second end portions each comprise a notch, the notches of the first and second end portions together forming an opening that geometrically conforms to a head of a tool for rotating the mounting device.

21. The mounting device of claim 19, wherein the bend of each opposing arm defines an aperture for receiving a cable tie.

22. The mounting device of claim 19, wherein the engagement member comprises opposing depressions positioned at opposing ends of the plate and the opposing depressions comprise downwardly projecting surfaces angled in opposite directions relative to the bottom surface of the plate.

23. The mounting device of claim 19, further comprising retaining tabs comprising a first section and a second section and the first section forms an acute angle with the second section.

24. The mounting device of claim 23, wherein at least one of the first and second sections of the retaining tabs is transverse to a longitudinal axis of the channel with the mounting device secured within the channel.

* * * * *